United States Patent
Shah et al.

(10) Patent No.: US 10,567,235 B1
(45) Date of Patent: Feb. 18, 2020

(54) UTILIZING MULTI-POINT OPTIMIZATION TO IMPROVE DIGITAL CONTENT DISTRIBUTION

(71) Applicant: Facebook, Inc., Menlo Park, CA (US)

(72) Inventors: Nimish Rameshbhai Shah, Cupertino, CA (US); Raghavendra Rao Donamukkala, San Jose, CA (US); Chinmay Deepak Karande, Cupertino, CA (US); Shyamsundar Rajaram, San Francisco, CA (US); Robert Oliver Burns Zeldin, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 198 days.

(21) Appl. No.: 15/899,848

(22) Filed: Feb. 20, 2018

Related U.S. Application Data

(60) Provisional application No. 62/567,188, filed on Oct. 2, 2017.

(51) Int. Cl.
| | | |
|---|---|---|
| G06F 15/173 | (2006.01) | |
| H04L 12/24 | (2006.01) | |
| H04L 12/26 | (2006.01) | |
| H04L 29/08 | (2006.01) | |
| G06Q 30/02 | (2012.01) | |

(52) U.S. Cl.
CPC ........ *H04L 41/142* (2013.01); *H04L 41/0654* (2013.01); *H04L 41/16* (2013.01); *H04L 43/16* (2013.01); *H04L 67/22* (2013.01); *G06Q 30/0255* (2013.01)

(58) Field of Classification Search
CPC ....... G06N 3/0445; G06N 3/0454; G06N 3/08
See application file for complete search history.

(56) References Cited

U.S. PATENT DOCUMENTS

| | | | |
|---|---|---|---|
| 2015/0317357 A1* | 11/2015 | Harmsen | G06N 5/025 707/723 |
| 2016/0267526 A1* | 9/2016 | Xu | G06Q 30/0246 |
| 2016/0350675 A1* | 12/2016 | Laks | G06Q 50/01 |

\* cited by examiner

*Primary Examiner* — Brian Whipple
*Assistant Examiner* — Gregory P Tolchinsky
(74) *Attorney, Agent, or Firm* — Keller Jolley Preece

(57) ABSTRACT

The present disclosure is directed toward systems, methods, and non-transitory computer readable media that use multi-point optimization for delivery of digital content by way of a digital content distribution platform. In particular, one or more embodiments described herein receive a content item from a content provider to be displayed to users of the platform. The embodiments optimize delivery to obtain a first target event and determine metrics that delivery of the content item is expected to satisfy. If the actual metrics of delivery fail to satisfy the expected metrics, delivery is re-optimized to obtain either the first target event or a second target event.

20 Claims, 9 Drawing Sheets

UTILIZING MULTI-POINT OPTIMIZATION TO IMPROVE DIGITAL CONTENT DISTRIBUTION

CROSS REFERENCE TO RELATED APPLICATIONS

This application claims priority to and the benefit of U.S. Provisional Application No. 62/567,188, filed Oct. 2, 2017, the entire contents of which are hereby incorporated by reference.

BACKGROUND

Advancements in computing devices and networking technology have led to a variety of innovations in providing targeted digital content across computer networks. For example, online digital content distribution platforms are now able to serve targeted digital content to users spanning the globe almost instantaneously. Indeed, whether in entertainment, employment, or advertising, modern online digital content distribution platforms are able to provide instantaneous targeted digital content to thousands of users via various types of client devices.

Despite its advantages, inefficiencies still exist in the way these platforms present content to users. For example, while conventional digital content distribution platforms can execute digital content campaigns and provide targeted content to selected users (e.g., a targeted audience), the systems used for doing so are often rigid and narrowly focused. To illustrate, some conventional platforms optimize delivery of content to members of a target audience most likely to perform a particular action, such as a purchase of an advertised item or a subscription to a news outlet. However, if most members of the target audience are unlikely to perform the particular action, the content will not be distributed to the degree desired by the content provider.

Such rigidity further aggravates distribution problems for some content providers in the context of content selection processes. Many popular platforms use specific content selection processes when deciding which content to present to a user. These processes often incorporate algorithms that base the decision on factors, such as quality of content presentation, content provider bid, and likelihood that the user will perform a particular result. If any of these factors are weak, the content provider stands little chance of having its content selected for display. Consequently, the digital content campaign may provide no benefit to the provider.

Therefore, it would be beneficial to overcome these deficiencies in digital content distribution platforms.

SUMMARY

Several embodiments described herein provide benefits and solve one or more of the foregoing or other problems in the art by providing systems, methods, and non-transitory computer readable media that use multi-point optimization for delivery of digital content by way of a digital content distribution platform (e.g., social networking system). In particular, one or more embodiments described herein receive a content item from a content provider to be displayed to users of the platform. The embodiments optimize delivery to result in a first target event and determine metrics that delivery of the content item is expected to satisfy. If the actual metrics of delivery fail to satisfy the expected metrics, delivery is re-optimized to result in either the first target event or a second target event.

More particularly, one or more embodiments use a machine learning model, which has been trained to optimize delivery for a first target event, to determine the probability that such an event will result from delivery of the content item to corresponding users. A content selection process is used to determine whether to deliver the content item, which determination is at least partly based on the probability that the first target event will result from delivery. Additionally, several embodiments monitor the actual metrics of delivery for the content item and determine whether they satisfy the expected metrics. If the expected metrics are not satisfied, the embodiments use the first machine learning model, along with a second machine learning model trained to optimize delivery for a second target event, to determine weighted sum probabilities that either the first target event or the second target event will result from delivery of the content item. The content selection process is then used to determine whether to deliver the content item based on the weighted sum probabilities.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
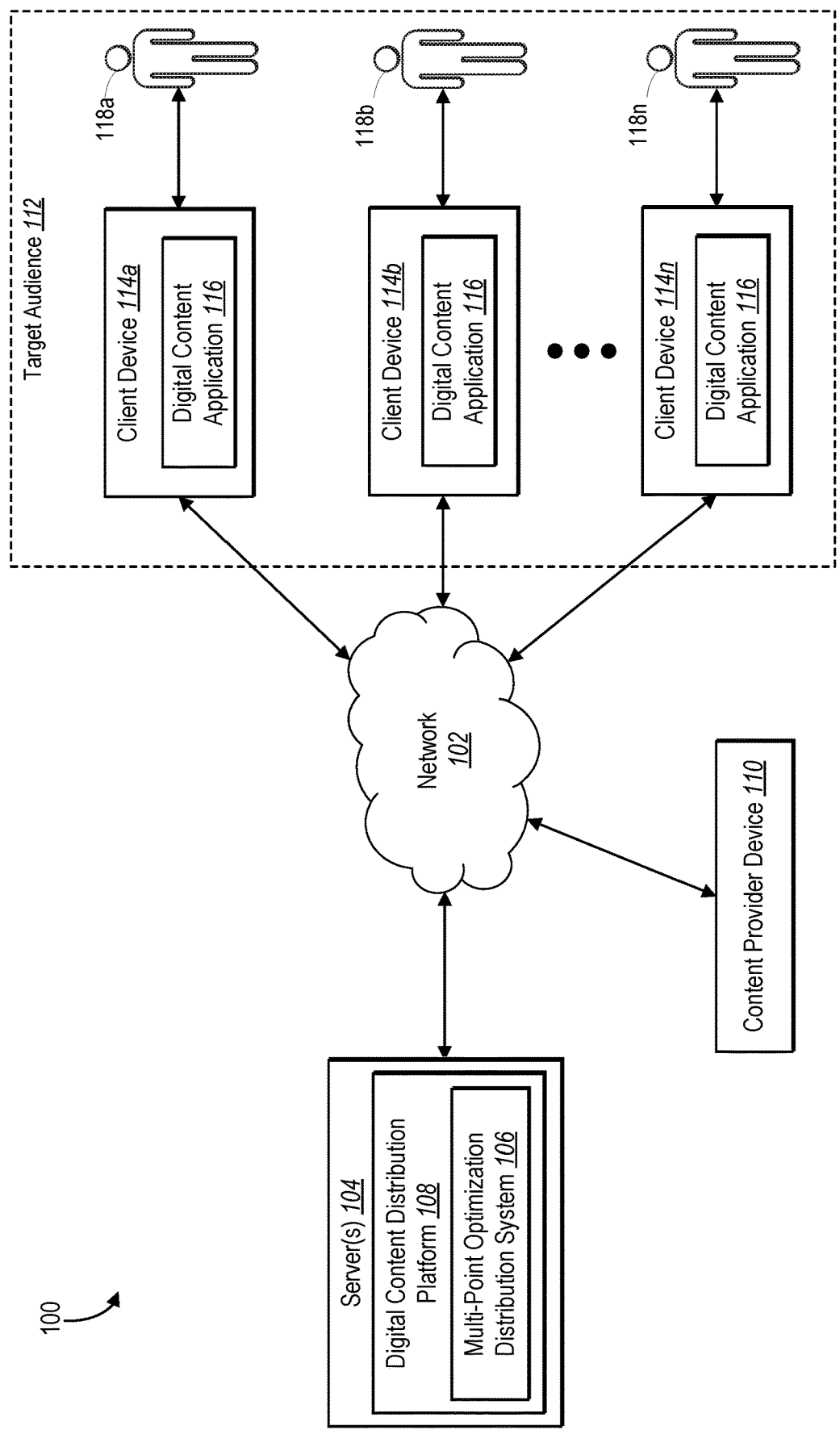
FIG. 1 illustrates a schematic diagram of an example environment of a multi-point optimization distribution system in accordance with one or more embodiments.

One or more embodiments described herein provide benefits and solve one or more of the foregoing or other problems in the art with a multi-point optimization system that improves delivery of digital content to users by way of a digital content distribution platform. In particular, one or more embodiments described herein receive a content item from a content provider to be provided to users of the digital content distribution platform. The embodiments optimize delivery to obtain a first target event and determine metrics that delivery of the content item is expected to satisfy. The multi-point optimization distribution system then monitors the actual metrics of the content item's delivery. If the actual metrics of delivery fail to satisfy the expected metrics, delivery is re-optimized to obtain either the first target event or a second target event.

To illustrate, the multi-point optimization distribution system can receive a content item from a content provider to be delivered to users by way of a digital content distribution platform. The multi-point optimization distribution system can determine metrics that delivery of the content item is expected to satisfy. Using a first machine learning model trained to optimize delivery for a first target event, the multi-point optimization distribution system can determine probabilities that such an event will result from delivery of the content item to corresponding users. Additionally, the multi-point optimization distribution system can use a content selection process to determine whether to deliver the content item based, at least in part, on the probabilities that the first target event will result. Further, the multi-point optimization distribution system can monitor the actual metrics of delivery for the content item and determine whether they satisfy the expected metrics. If the expected metrics are not satisfied, the multi-point optimization distribution system can use the first machine learning model, along with a second machine learning model trained to optimize delivery for a second target event, to determine weighted sum probabilities that either the first target event or the second target event will result from delivery of the content item. The content selection process is then used again to determine whether to deliver the content item based on the weighted sum probabilities.

As just mentioned, in one or more embodiments, the multi-point optimization distribution system receives a content item (e.g., advertisement, news article, or link to a website) from a content provider to be delivered to users by way of a digital content distribution platform. For example, the multi-point optimization distribution system may receive a file containing a content item (e.g., digital asset comprising media and text) from the content provider to be held in the system's data storage. Alternatively, the content provider may provide access to a content item stored on a server of the content provider. The received content item may alternatively be as simple as a link to a website or the content item may be an advertisement, news article, or other form of content containing such a link.

As mentioned above, the multi-point optimization distribution system determines metrics that delivery of the content item is expected to satisfy. These metrics may be determined by identifying metrics received from the content provider. If so, the expected delivery metrics may be received at the same time the content item is received. Alternatively, the multi-point optimization distribution system may determine the metrics directly. The expected delivery metrics provide a baseline to which the actual delivery metrics are compared.

Utilizing a first machine learning model trained to optimize content delivery for a first target event, the multi-point optimization distribution system can determine probabilities that the first target event will result from delivery of the content item to corresponding users. For example, the multi-point optimization distribution system may determine probabilities that users will purchase a product or service advertised by the content item if that content item were delivered to those users. Each determined probability corresponds to a particular user. Further, in one or more embodiments, all corresponding users may be members of a target audience selected by the content provider or, alternatively, by the multi-point optimization distribution system.

In addition, as mentioned above, the multi-point optimization distribution system uses a content selection process to determine whether to deliver the content item based, at least in part, on the determined probabilities that the first target event will result from delivery of the content item. For example, if the multi-point optimization distribution system determines, by using the first machine learning model, that the first target event has a low probability of resulting from delivery of the content item to a particular user, the multi-point optimization distribution system may elect not to deliver the content item to that user. In one or more embodiments, the probabilities that the first target event will result from delivery may be the only factor considered by the content selection process. In other embodiments, other factors—such as quality or past reception of the content item, relevance of the content item in light of current or upcoming events, or offers of payment (e.g., bids) by the content provider—may also be considered by the content selection process.

Additionally, as mentioned, the multi-point optimization system determines whether or not the actual delivery metrics (e.g., number of impressions, number of clicks, usage of campaign budget) of the content item fail to satisfy the expected delivery metrics. This may comprise determining whether the actual delivery metrics fail to meet threshold metrics established relative to the expected metrics, or whether the actual delivery metrics match the expected metrics exactly.

If the actual delivery metrics of the content item fail to satisfy the expected delivery metrics, the multi-point optimization distribution system utilizes a second machine learning model trained to optimize content delivery for a second target event, in addition to using the first machine learning model, to determine weighted sum probabilities that the first target event or the second target event will result from delivery to corresponding users. Each machine learning model determines probabilities that the model's respective target event will result from delivery of the content item independent. The multi-point optimization distribution system can then apply a weight to each set of probabilities and add the weighted probabilities together to determine weighted sum probabilities.

Subsequently, the multi-point optimization distribution system utilizes the content selection process again to determine whether to deliver the content item. But the determination is now based, at least in part, on the determined weighted sum probabilities. In one or more embodiments, the weighted sum probabilities are the only factor considered in the content selection process. In one or more other embodiments, other factors may also be considered.

If the actual delivery metrics of the content item continue to fail to satisfy the expected delivery metrics, one or more embodiments may continue to incorporate more machine learning models, each of which is trained to optimize content delivery for an additional target event, to determine the probabilities that those target events will result from delivery of the content item to corresponding users. Those determined probabilities may then be used, along with the probabilities that the first target event will result or the second target event will result, to determine weighted sum probabilities that any of the target events under consideration will occur. These weighted sum probabilities can then be used in subsequent uses of the content selection process.

The multi-point optimization distribution system provides several advantages over conventional digital content distribution systems. For example, the multi-point optimization distribution system can optimize a digital content campaign by determining the weighted sum probabilities that one of multiple target events will result from delivery of a content item to corresponding users. Indeed, there is value to a content provider in many of the possible events that may result from delivery of a content item. By narrowly focusing on a particular target event (e.g., purchases or subscriptions), the content provider does not benefit from the value offered by other events (e.g., views or clicks). Thus, the multi-point optimization distribution system provides a more holistic approach to providing content to users and benefits to content providers by incorporating the value of those other events into the content selection process.

Furthermore, the multi-point optimization distribution system alleviates the burden content provider's bear when their content item is not sufficiently competitive in the content selection process. As discussed above, many digital content distribution platforms utilize content selection processes that determine which content item to deliver to a user based, at least in part, on the probabilities that the target events of the content items will result from delivery. If a particular content item's target event is unlikely to result, a competitor provider's content item with a corresponding target event that is very likely to result has an advantage of being selected over the content provider's content item. Further, even if a content item's target event has a moderate (or even high) probability of resulting from delivery, a competitor provider's content item may still have an advantage if its target event is relatively more likely to result. Therefore, under conventional digital content distribution systems, a content provider's content item may consistently fail to be selected if competitor content items have an associated target event that is relatively more likely to occur. By using weighted sum probabilities that one of several target events will result from delivery, the multi-point optimization distribution system improves the competitiveness of a content item that has not been successful in the content selection process.

Additionally, because the multi-point optimization distribution system incorporates the probabilities of multiple target events in the content selection process, the multi-point optimization distribution system increase flexibility for generating and executing digital content campaigns. Indeed, the multi-point optimization distribution system can employ a flexible model that considers multiple target events based on the preferences of a particular content provider for a particular campaign. Such flexibility has the advantage of bringing higher levels of engagement between a user of a digital content distribution platform and the content item.

As used herein, a "user" refers to an individual, company, business, group, or other entity who interacts with the digital content distribution platform by way of a client device. For example, a user can include a member or subscriber of a social network (e.g., a social network that includes or implements the multi-point optimization distribution system). In addition, the term "client device" refers to a computing device operated by a user and may include a device such as a desktop computer or a mobile device (e.g., a smartphone).

Furthermore, as used herein, a "content provider device" refers to a computing device operated by a content provider (e.g., an advertiser, marketer, author, streaming provider, studio, distributor or other publisher of digital content). For example, a content provider device can include one or more servers, computers, or mobile devices (e.g., smartphones) that communicate with the multi-point optimization distribution system and/or the client devices via a network. A content provider device can generate digital content (e.g., advertisements) and provide the generated digital content to the multi-point optimization distribution system, whereupon the multi-point optimization distribution system can distribute the digital content to the client devices. A content provider device can further present, for display, a GUI by which an advertiser, representative, operator, or other entity associated with the content provider device can input preferences associated with a digital content campaign.

Further, as used herein, a "digital content distribution platform" refers to any digital platform that may provide content to a user. A digital content distribution platform can include, but is not limited to, news sites, forums, chat rooms, or social networking systems. In one or more embodiments, the digital content distribution platform may implement the multi-point optimization distribution system. Alternatively, the multi-point optimization distribution system may be implemented as a separate system that communicates with the digital content distribution platform.

Additionally, as used herein, an "event" refers to an action a user takes with respect to a content item after the item has been delivered to the user. An event can include any action a user takes with respect to a content item, such as views, clicks, downloads, adding an item to a cart for purchase, purchases, subscriptions, likes, shares, etc.

Furthermore, as used herein, a "target event" is an event that is designated as the objective of delivery of the content item. A target event may be provided by the content provider. Alternatively, a target event may be determined by the multi-point optimization distribution system in response to goals given by the content provider, an analysis of the content item to be delivered, or by looking at a history of users targeted by the content provider.

Moreover, as used herein, the term "digital content campaign" or "content campaign" or "campaign" refers to a series of actions, rules, and/or processes for disseminating digital content. In particular, a digital content campaign includes one or more content items (e.g., advertisement) and may include one or more campaign parameters for disseminating the digital content. To illustrate, a digital content campaign may include at least one content item and a first target event. These campaign parameters may be implemented by the content provider or, alternatively, by the digital content distribution platform or multi-point optimization distribution system.

Further, as used herein, a "machine learning model" refers to a computer representation that can be tuned (e.g., trained) based on inputs to approximate unknown functions. In particular, the term "machine-learning model" can include a model utilizing algorithms to learn from known data by analyzing the known data to learn general outputs that reflect patterns and attributes of the known data. This, in turn, allows the machine learning model to apply those patterns and attributes to determine the probability of an outcome for unknown data. For instance, a machine-learning model can include but is not limited to a neural network (e.g., a convolutional neural network or deep learning), decision tree, association rule learning, inductive logic programming, support vector learning, Bayesian network, regression-based model, principal component analysis, or a combination thereof.

Additionally, as used herein, the term "probabilities" refers to a set of probabilities that corresponds to a set of users. To illustrate, a first machine learning model determines probabilities that a first target event will result from delivery of a content item to corresponding users. Each probability determined by the first machine learning model corresponds to a particular user from the set of corresponding users. The first machine learning model determines this probability (that the first target event will result from delivery) for every user in the set of corresponding users. And each probability is determined independent of the probability determined for every other user of the set of corresponding users. The set of resulting probabilities is what is referred to as "probabilities." Consequently, "probability" is used to refer to a single probability that a target event will result from delivery of a content item to a single user.

Similarly, as used herein, the term "weighted sum probabilities" refers to a weighted sum of individual probabilities corresponding to certain target events, where each weighted sum probability is determined for a corresponding user from the set of corresponding users independent of the weighted sum probability of any other user from the set of corresponding users.

Moreover, as used herein, a "content selection process" is a process by which the multi-point optimization distribution system determines which content item to present to a particular user of a digital content distribution platform. Generally speaking, a user may be a member of the target audience chosen by several content providers (e.g., several content providers have chosen to target a certain age group in which the user is a member). When the user becomes eligible to view a content item (e.g., an advertisement or news article), the multi-point optimization distribution system engages in a process to select which content providers' content item to deliver to the user. More narrowly viewed, the content selection process determines whether to deliver a particular content item to a user.

More detail regarding the multi-point optimization distribution system will now be provided with reference to the figures. For example, FIG. 1 illustrates a schematic diagram of an example environment 100 for implementing a multi-point optimization distribution system 106 in accordance with one or more embodiments. An overview of the multi-point optimization distribution system 106 is described in relation to FIG. 1. Thereafter, a more detailed description of the components and processes of the multi-point optimization distribution system 106 is provided in relation to the subsequent figures.

As shown in FIG. 1, the environment 100 includes (i.e., may be implemented by) a network 102, server(s) 104, a content provider device 110, and a target audience 112. Each of the components of the environment 100 can communicate via the network 102, and the network 102 may be any suitable network over which computing devices can communicate. Example networks are discussed in more detail below in relation to FIG. 6.

As illustrated in FIG. 1, the server(s) 104 include the multi-point optimization distribution system 106 and a digital content distribution platform 108. Though FIG. 1 shows the multi-point optimization distribution system 106 incorporated as a subsystem of the digital content distribution platform 108, one or more embodiments may implement the multi-point optimization distribution system 106 as its own separate system on the server(s) 104, which may communicate with the digital content distribution platform 108. If the multi-point optimization distribution system 106 is implemented separately on the server(s) 104, the multi-point optimization distribution system 106 may communicate with the digital content distribution platform 108 directly, bypassing the network 102, and using an appropriate communication protocol. Whether the multi-point optimization distribution system 106 is implemented as a subsystem or as a separate system, the multi-point optimization distribution system 106 may communicate with the digital content distribution platform 108 in order to deliver to the digital content distribution platform 108 a content item for display to users 118a-118n, to gather information relevant regarding users 118a-118n and their interactions with displayed content items, or any other information relevant to the purposes of the multi-point optimization distribution system 106. Additionally, the multi-point optimization distribution system 106, as well as the digital content distribution platform 108, may be implemented by (e.g., installed on) the server(s) 104 as hardware, software, or both.

Additionally, although FIG. 1 depicts the multi-point optimization distribution system 106 located on the server(s) 104, in some embodiments, the multi-point optimization distribution system 106 may be implemented by (e.g., located entirely or in part) one or more other components of the environment 100. For example, the multi-point optimization distribution system 106 may be implemented by the content provider device 110, the server(s) 104, the client devices 114a-114n, and/or the network 102. Similarly, although FIG. 1 depicts the digital content distribution platform 108 located on the server(s) 104, in some embodiments, the digital content distribution platform 108 is located externally from the server(s) 104 at, for example, one or more third-party servers.

As illustrated in FIG. 1, the multi-point optimization distribution system 106 may communicate with the content provider device 110 via network 102 to receive a content item for delivery to users by way of the digital content distribution platform 108. Additionally, the multi-point optimization distribution system 106 may receive other information from the content provider device 110, such as a first target result to be obtained by delivery of the content item, a bid for delivery of the content item, a budget total for the content provider's digital content campaign, characteristics of the target audience 112, payments for delivery of the content item, or any other information relevant to delivery of the content item. Additionally, the multi-point optimization distribution system 106 may provide information to the content provider device 110. Such information may include reports of delivery and its resulting events.

As further illustrated in FIG. 1, the target audience 112 includes client devices 114a-114n and users 118a-118n. In one or more embodiments, the target audience 112 includes a group of users 118a-118n that share a common set of characteristics (e.g., age, geographic location, gender, hobbies, level of education, etc.). In some embodiments, these characteristics are provided by the content provider through the content provider device 110. Alternatively, the characteristics may be determined by the multi-point optimization distribution system 106 or the digital content distribution platform 108 in response to goals given by the content provider, an analysis of the content item to be delivered, or by looking at a history of users targeted by the content provider. These target audience characteristics are used to reach only those users 118a-118n whom the content provider believes will be interested in or benefited by the particular content item.

As depicted in FIG. 1, the client devices 114a-114n each include a digital content application 116 (e.g., a social networking application and/or a messaging application). The digital content application 116 can be implemented in whole or in part by software or hardware installed on a client device. The digital content application 116 may be a client device version of the digital content distribution platform 108. In one or more embodiments, the digital content application 116 may be implemented as a separate application on the client devices 114a-114n. Alternatively the digital content application 116 is implemented as an application accessible through a web browser controlled by client devices 114a-114n.

Digital content application 116 can facilitate communications between users 118a-118n by way of the client devices 114a-114n, and may further facilitate communications with the multi-point optimization distribution system 106. Indeed, through the network 102, the client devices 114a-114n may send a content item request to and receive a content item from the multi-point optimization distribution system 106. Additionally, through the network 102, the multi-point optimization distribution system 106 may monitor the events resulting from delivery of the content item to the users 118a-118n.

As further illustrated in FIG. 1, the server(s) 104 may generate, store, receive, and transmit any type of data, such as digital content, user activity information, and/or user characteristics. For example, the server(s) 104 may transmit data to a client device to provide digital content, as mentioned above. Furthermore, the server(s) 104 can communicate with a client device via the network 102 to receive user activity information and/or user characteristics, and the server(s) 104 can further store the received information. The server(s) 104 can also transmit electronic messages between one or more of client devices 114a-114n. In one example embodiment, the server(s) 104 comprise a content server. The server(s) 104 can also comprise a communication server or a web-hosting server.

In one or more embodiments, the server(s) 104 include a digital content server and/or a content selection server. For example, the server(s) 104 can include a digital content server that receives content item requests associated with a client device (e.g., client device 114a), analyzes user characteristics associated with the user 118a, and provides digital content to the client device 114a in response to content item requests. The content distribution server can further generate and publish digital content (e.g., advertisements). In addition, the digital content server can set or identify campaign preferences for a digital content campaign such as bidding amounts (for an online content selection process), budgets, a target audience, preferred distribution avenues, or significance ratings for one or more event categories.

Moreover, in one or more embodiments, the server(s) 104 can include a content selection server that can perform an online content selection process. For example, in response to receiving a content item request, the online content selection process can generate bids for a plurality of content providers based on digital content campaign parameters, such as target events. Moreover, the content selection server can determine a winning bid and corresponding winning content provider. Based on the winning bid, the digital content server can provide digital content from the winning content provider to a client device of a user.

By way of example, in one or more embodiments, the multi-point optimization distribution system 106 provides (e.g., via the server(s) 104) a GUI to the content provider device 110. The GUI includes a display of target events as well as input fields (e.g., radio buttons, check boxes, text fields, etc.) for defining a priority of each event. From the GUI provided to the content provider device 110, the multi-point optimization distribution system 106 receives (e.g., via the server(s) 104) an indication of the priority of each of a number of events from the content provider device 110. Using the priority of the events, the multi-point optimization distribution system may optimize delivery of the content item to those users most likely to perform the highest priority event (i.e., the first target event) or several of the top priority events (e.g., deliver to obtain the first target event or the second target event)

Figure 2A:
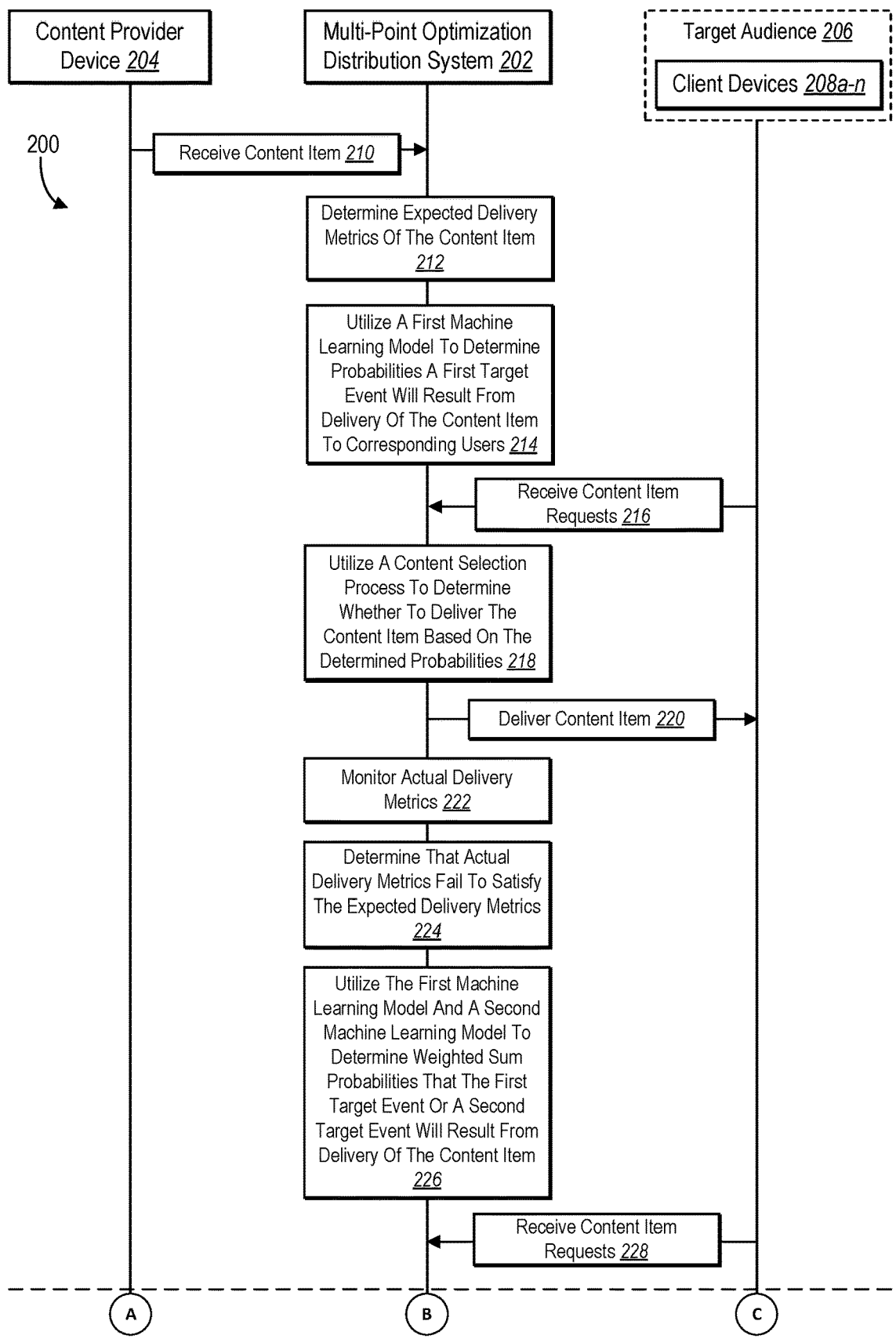
FIGS. 2A-2C illustrate a sequence diagram in which a multi-point optimization distribution system provides content to a target audience in accordance with one or more embodiments.
Figure 2B:
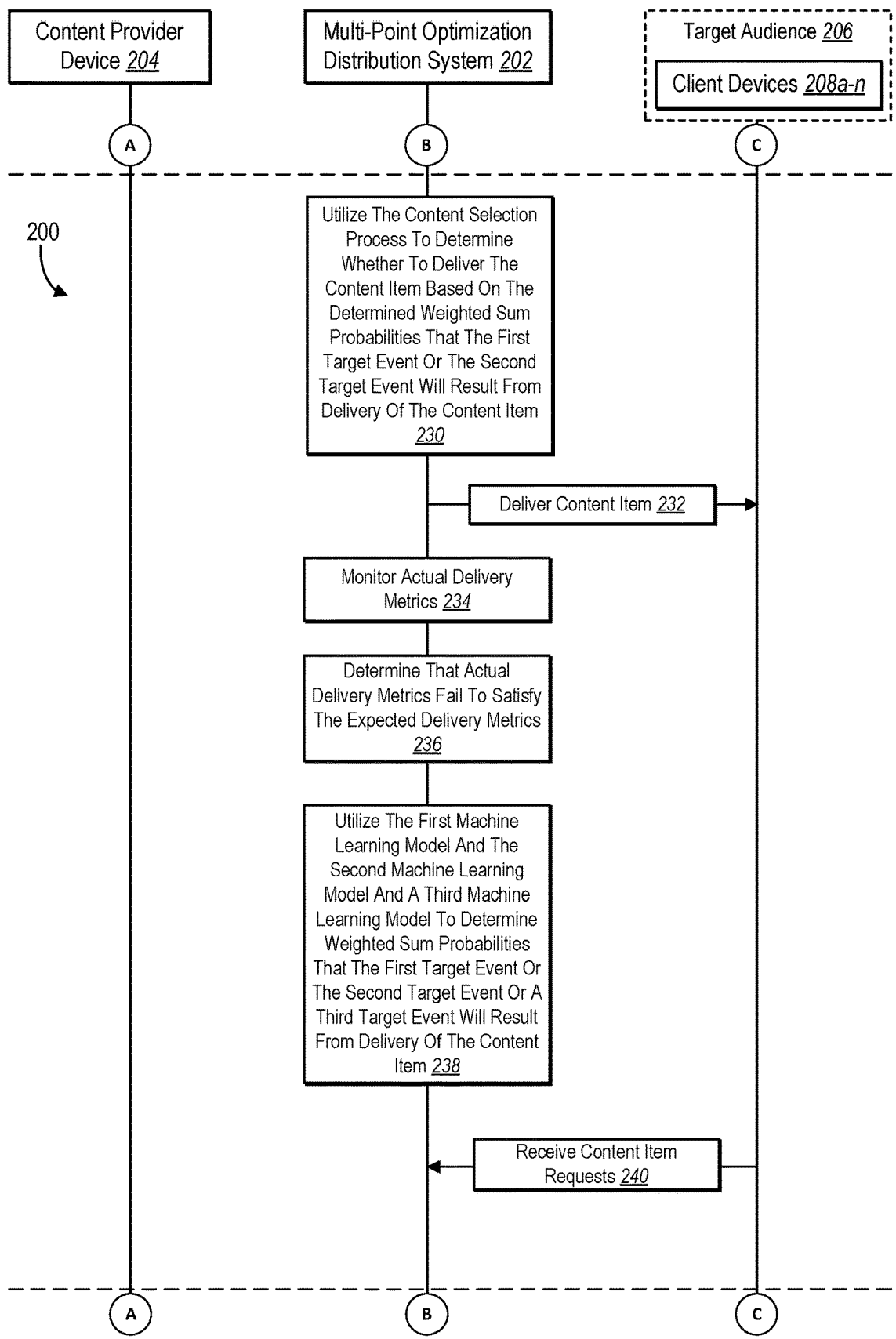
Figure 2C:
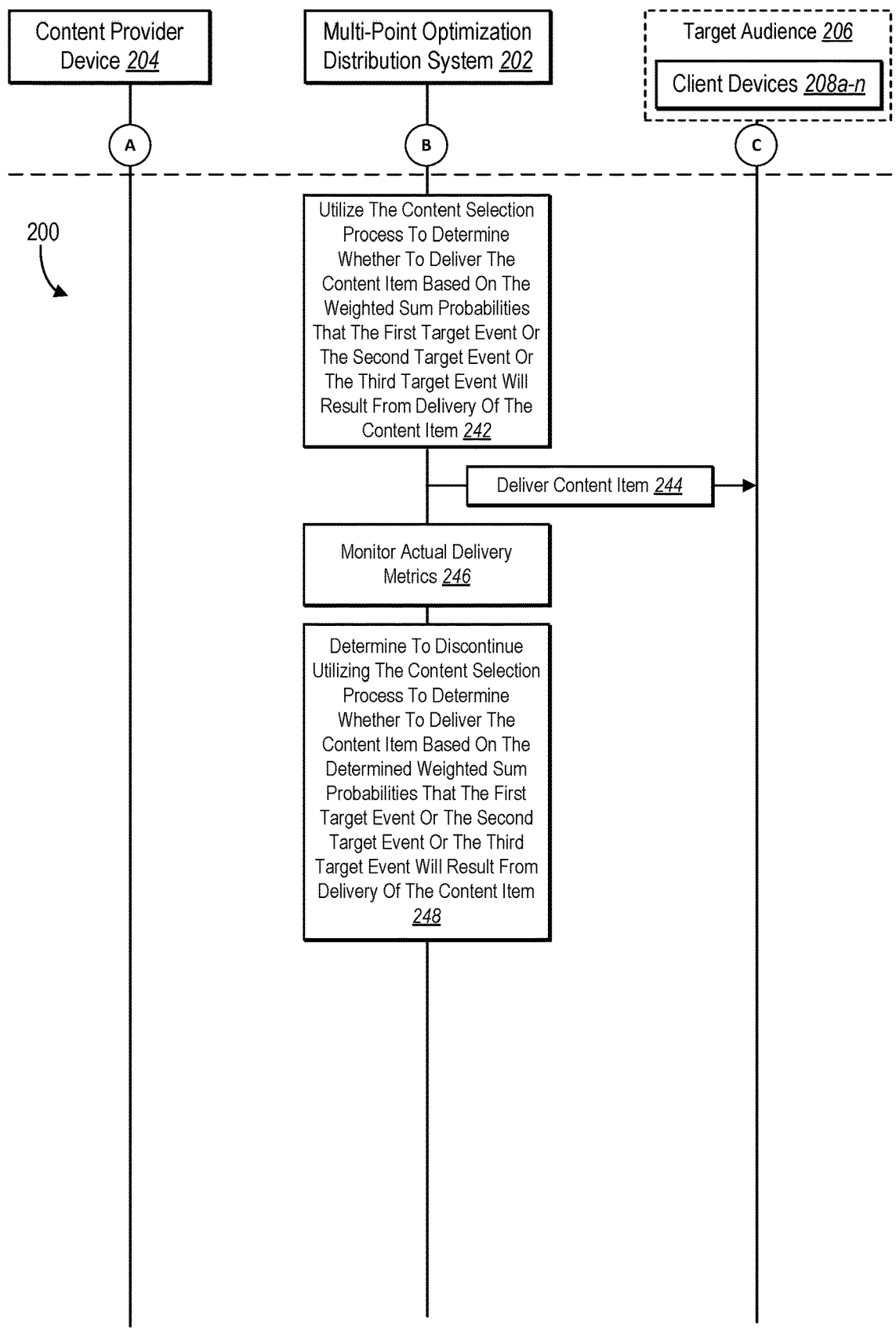

FIGS. 2A-2C illustrate a sequence diagram 200 in which a multi-point optimization distribution system 202 communicates with a content provider device 204 and a target audience 206, comprising client devices 208a-208n, to provide content to the target audience 206 in accordance with one or more embodiments. The multi-point optimization distribution system 202 may be implemented as shown in FIG. 1 or in any of the alternative embodiments aforementioned. Similarly, in one or more embodiments, the target audience 206 and content provider device 204 are similar to those shown in FIG. 1 and described above.

As shown in FIG. 2A, the multi-point optimization distribution system 202 receives a content item (210) from the content provider by way of the content provider device 204. In one or more embodiments, receiving a content item (210) from the content provider device 204 may also include receiving other information (e.g., first target event, second target event, a bid of how much the content provider is willing to pay per delivery of the content item, a budget total for the digital content campaign, characteristics of a target audience) relevant to delivery of the content item. This other information may be received directly from the content provider or it may be determined by the multi-point optimization distribution system 202 based on information already received (e.g., content provider account information, goals given by the content provider, an analysis of the content item to be delivered, looking at a history of users targeted by the content provider, past bids or budgets).

After receiving the content item (210), the multi-point optimization distribution system 202 determines expected delivery metrics of the content item (212). In one or more embodiments, the expected delivery metrics are established by the content provider. In alternative embodiments, the expected delivery metrics may be determined by the multi-point optimization distribution system 202 based on information already received (e.g., content provider account information, goals given by the content provider, an analysis of the content item to be delivered, looking at a history of users targeted by the content provider, past bids or budgets, delivery metrics from past campaigns of the content provider or of other content providers using a similar content item).

In one or more embodiments, the expected delivery metrics may set a delivery pace that remains constant throughout the duration of the digital content campaign. The duration of the digital content campaign may be limited in time, budget, or any other factor or combination of factors that the content provider (or, alternatively, multi-point optimization distribution system 202 or digital content distribution platform) chooses. For example, a content provider may provide a content item, select a budget of $1,000, and choose for the content item to be displayed to users of the digital content distribution platform at an even pace over a ten-day period. If it were established that the content provider would pay $1 for every delivery, then the multi-point optimization distribution system 202 would determine that it would expect to deliver the content item 100 times per day for the next ten days.

In one or more alternative embodiments, the expected delivery metrics may set a delivery pace that changes over time. To further illustrate using the same example described above, the content provider may instead choose the majority of deliveries of its content item to occur within the first half of the ten-day period with any remaining deliveries covering the latter half. Based on this choice, the multi-point optimization distribution system 202 may expect the content item to be delivered 150 times per day over the first five days of the campaign and fifty times per day over the course of the latter five days. In several embodiments, the content provider may choose any variable rate at which it wishes the content item to be delivered and the multi-point optimization distribution system 202 will determine expected delivery metrics accordingly.

As shown in FIG. 2A, the multi-point optimization distribution system 202 then utilizes a first machine learning model to determine probabilities a first target event will result from delivery of the content item to corresponding users (214). In one or more embodiments, the corresponding users may be members of a target audience selected by the content provider. In alternative embodiments, especially where the content provider has not chosen a target audience, corresponding users may be those who are currently eligible to view a content item. Though FIG. 2A illustrates the multi-point optimization distribution system 202 performing utilizing the first machine learning model after it has determined the expected delivery metrics of the content item, one or more embodiments may reverse the order of the two steps or engage in both steps concurrently without affecting the system's advantages or benefits.

The first machine learning model is trained to optimize content delivery for a first target event. In general, a machine learning model is trained by using algorithms to learn from known data by analyzing the known data to learn general outputs that reflect patterns and attributes of the known data. This, in turn, allows the machine learning model to apply those patterns and attributes to determine the probability of an outcome for unknown data. For example, several embodiments may use a first machine learning model trained by using algorithms to learn from known data to learn the patterns and attributes that lead to the result of the first target event upon delivery of the content item. The first machine learning model may then determine a probability that a particular user will engage in the first target even after receiving the content item.

In one or more embodiments, the first machine learning model determines probabilities that the first target event will result from delivery of the content item to corresponding users based on the histories of the corresponding users of engaging in the first target event (i.e., be trained by a user's history). For example, if the first target event is the purchase of a product or service, and a user of the set of corresponding users has never purchased a product or service from a content item displayed by way of a digital content distribution platform, the first machine learning model may determine that the probability of achieving a purchase by delivering the content item to that particular user is very low (or non-existent). Alternatively, and especially when choosing whether to deliver a content item to a new user of a digital content distribution platform, the first machine learning model may analyze the data from other users (i.e., be trained by looking at data from others) and match relevant behavioral features extracted from that analysis to the features of the new user in determining the probability the new user will engage in the first target event.

To be clear, the first machine learning model determines a probability the first target event will result from delivery of the content item to a corresponding user from the set of corresponding users. The first machine learning model determines this probability for every user from the set of corresponding users. And each probability is determined independent from the probability of any other user from the set of corresponding users. The resulting set of probabilities are referred to as the determined probabilities that the first target event will result from delivery of the content item to corresponding users.

As illustrated in FIG. 2A, the multi-point optimization distribution system 202 further receives content item requests (216) from the target audience 206. More specifically, the multi-point optimization distribution system 202 receives content item requests from the client devices 208a-208n whose respective users are members of the target audience 206. In several embodiments, content item requests are received when the corresponding client devices 208a-208n are eligible to display a content item. In other words, content item requests are received when the users of the corresponding client devices 208a-208n are eligible to view a content item. Client devices 208a-208n are generally eligible to display a content item when digital content application 116 of FIG. 1 is activated and the client device 208a-208n has begun displaying content.

As shown in FIG. 2A, in response to receiving content item requests (216) the multi-point optimization distribution system 202 utilizes a content selection process to determine whether to deliver the content item based on the determined probabilities that the first target event will result from delivery of the content item (218). As described above, a particular user may be a member of the target audience 206 chosen by several content providers (e.g., several content providers have chosen to target a certain age group in which the user is a member). When the user becomes eligible to view a content item (e.g., an advertisement or news article), the multi-point optimization distribution system 202 engages in a process to select which content providers' content item to deliver to the user. In other words, the content selection process may be described as determining whether to deliver a particular content item (from a group of eligible content items) to the user. The probability corresponding to the particular user (that the user will engage in the first target event as a result of delivery of the content item) is used in the content selection process. When there are multiple users eligible to view a content item on the digital content distribution platform, the multi-optimization distribution system 202 may receive several content item requests. Therefore, the multi-point optimization distribution system 202 uses the content selection process for each eligible user to determine whether to deliver a particular content item to that user.

In one or more embodiments, factors in addition to the probability determined by the first machine learning model are considered in the content selection process. For example, when a content provider provides a content item through the content provider device 204 to the multi-point optimization distribution system 202, the content provider may also provide a bid informing the multi-point optimization distribution system 202 how much the content provider is willing to pay to have the content item delivered to a user. The multi-point optimization distribution system 202 may combine the content provider's bid with the probability determined by the first machine learning model to determine a total value score. The total value score may be used by the content selection process to determine whether to deliver the content item to the user.

If the content selection process selects the content item to deliver to a user (or multiple users), then the multi-point optimization distribution system 202 delivers the content item to the corresponding user(s) (220). To illustrate, if User 1, User 2, and User 3 are all eligible to view a content item, their respective client devices would each send a content item request to the multi-point optimization distribution system 202. The multi-point optimization distribution system 202 would then utilize a content selection process for each of User 1, User 2, and User 3 to determine whether to deliver a content provider's content item to each user. If the content selection process for User 1 and User 2 selects the content item, the content item is delivered to the client devices of User 1 and User 2. Because the content selection process for User 3 did not select the content item, the content item will not be delivered to User 3's client device (some competitor's content item will likely be sent instead).

As further illustrated in FIG. 2A, the multi-point optimization distribution system 202 monitors the actual delivery metrics of the content item (222). In one or more embodiments, monitoring the actual delivery metrics occurs regardless of whether a content item was selected by a content selection process for delivery. Generally, monitoring actual delivery metrics includes monitoring whether or not a content item has been selected for delivery by the content selection process and, if so, how many times (i.e., keeping track of each content item delivery). This may look at how many times the content item has been selected for delivery over a particular amount of time or how many times the content item has been selected for delivery compared to how many deliveries the total campaign budget allows.

Additionally, the multi-point optimization distribution system 202 determines that the actual delivery metrics of the content item fail to satisfy the expected delivery metrics of the content item (224). This determination may be made in conjunction with monitoring the actual delivery metrics of the content item (222) or it may be made subsequent to it.

Determining that the actual metrics fail to satisfy the expected metrics may include determining that the actual delivery metrics of the content item fail to exactly match the expected delivery metrics. To illustrate using the example described above, if the multi-point optimization distribution system 202 expected the content item to be delivered 100 times per day over the course of ten days, any failure to meet the 100 times per day mark would be a failure to satisfy the expected delivery metrics. For example, if, after five days, the multi-point optimization distribution system 202 only tracked 499 deliveries instead of the expected 500, then the multi-point optimization distribution system 202 would determine that the actual delivery metrics have failed to satisfy the expected delivery metrics.

Alternatively, the determination that the actual delivery metrics fail to satisfy the expected delivery metrics may include determining that the actual delivery metrics fail to meet a threshold of delivery metrics established relative to the expected delivery metrics. To illustrate using the same example described above, the multi-point optimization distribution system 202 may determine that the content item is expected to be delivered 100 times per day throughout a ten-day period. However, the multi-point optimization distribution system 202 may establish a delivery threshold of ninety deliveries per day. Therefore, if the multi-point optimization distribution system 202 determines, at the end of the first day, that the content item was delivered ninety-one times that day, then it may determine that the actual delivery metrics have satisfied the expected delivery metrics. However, if the multi-point optimization distribution system 202 determines that the content item was only delivered eighty-nine times by the end of the first day, then it will determine that the actual delivery metrics have failed to satisfy the expected delivery metrics.

The multi-point optimization distribution system 202 may attempt to make this determination at any number of intervals during the digital content campaign, whether the intervals are regular or irregular. For example, in one or more embodiments, the multi-point optimization distribution system 202 may attempt to determine whether the actual delivery metrics fail to satisfy the expected delivery metrics at the end of every day. In one or more alternative embodiments, the multi-point optimization distribution system 202 may attempt to make the determination every minute. Any variety of irregular intervals may be used as well.

If the actual delivery metrics of a content item are determined to have failed to satisfy the expected delivery metrics, the multi-point optimization distribution system 202 utilizes the first machine learning model and a second machine learning model to determine weighted sum probabilities that the first target event or a second target event will result from delivery of the content item (226). Similar to the first target result, the multi-point optimization distribution system 202 may receive the second target result from the content provider by way of the content provider device 204 when it receives the content item. Alternatively, the second target event is determined by the multi-point optimization distribution system 202 based on information already received (e.g., content provider account information, goals given by the content provider, an analysis of the content item to be delivered, looking at a history of users targeted by the content provider, past bids or budgets).

In general, the second target event is an event that is more probable to result from delivery of the content item than the first target event. For example, a content provider may choose, as the first target event, a purchase of a product advertised by the content item. But in order for a user to purchase an advertised product, the user must first experience a series of "lesser" events (e.g., view the content item, click the link, add the product to the user's cart, etc.) Most users typically lose interest before a purchase happens; therefore, the probabilities of a purchase resulting from delivery may be low. Consequently, a content provider that optimizes delivery of a content item for purchases will be at a disadvantage in the content selection process. However, the probabilities that a user will click a link are much higher, because users are more inclined to click links. Therefore, if a content provider chooses a click as a second target event, the high probability of the click may be sufficient to increase the corresponding content item's competitiveness (by way of the total value score) in the content selection process as will be discussed in more detail below. However, persons skilled in the art will recognize the second target event may be less probable to result than the first target event but may still be sufficient to provide the content item with strengthened competitiveness in the content selection process.

In the same way that the first machine learning model is trained, the second machine learning model is trained to optimize content delivery for the second target event and is able to determine probabilities that the second target event will result from delivery of the content item to corresponding users. The probabilities determined by the second machine learning model are determined independent of the probabilities determined by the first machine learning model. In other words, the probability that the first target event will result from delivery of the content item does not affect the probability that the second target event will occur. However, in one or more embodiments, the probabilities determined by the first machine learning language may have such an effect.

As mentioned above, the probabilities determined by the first machine learning model and the probabilities determined by the second machine learning model are used to determine weighted sum probabilities. To determine weighted sum probabilities, the multi-point optimization distribution system 202 applies a first weight to the determined probabilities that the first target event will result from delivery, applies a second weight to the determined probabilities that the second target event will result from delivery, and adds the weighted probabilities together. In one or more embodiments, the weights applied to the corresponding probabilities are determined by the content provider as representations of priority of the target events. For example, if the content provider values the first target event by a magnitude of four times greater than the second target event, then the multi-point optimization distribution system 202 may apply a value of 0.8 to the probabilities corresponding to the first target event and a value of 0.2 to the probabilities corresponding to the second target event. Alternatively, the applied weights may be determined by the multi-point optimization distribution system 202. In either case, the weighted sum probabilities are combined with the content provider's bid (and any other factors used) to determine a new total value score to be used in the content selection process.

This provides a great advantage over conventional content distribution systems. In conventional systems, if a content provider who has optimized a content campaign for a "greater" event (e.g., a purchase), the content item may never be delivered because the probabilities that a purchase event will result from delivery of the content item may be very low, leading to a low total value score. Meanwhile, competitor providers may optimize their content campaigns for "lesser" events, which have higher probabilities of resulting from delivery of their corresponding content items; thus, the competitor providers will have higher total value scores by virtue of their greater probabilities. When the multi-point optimization distribution system 202 determines that the content provider has consistently failed the content selection process and, consequently, failed to meet the expected delivery metrics, the multi-point optimization distribution system 202 will re-optimize delivery to include a second target event. By using the second target event, the multi-point optimization distribution system 202 will increase the total value score of the content provider's content item because the total value score will now incorporate the probability that either the first target event or the second target event will result from delivery of the content item. Thus, the content item will have a better chance of being selected by the content selected process and the actual delivery metrics may improve to match the expected delivery metrics.

In one or more embodiments, the multi-point optimization distribution system 202 utilizes the first machine learning model and the second machine learning model in combination to determine weighted sum probabilities that either the first target event or the second target event will result from delivery of the content item. In one or more alternative embodiments, the multi-point optimization distribution system 202 uses the second machine learning in place of the first machine learning model to determine probabilities that only the second target event will result from delivery of the content item.

As further illustrated in FIG. 2A, the multi-point optimization distribution system 202 can receive more content item requests (228). Consequently, the multi-point optimization distribution system 202 utilizes the content selection process to determine whether to deliver the content item based on the determined weighted sum probabilities that the first target event or the second target event will result from delivery of the content item (230) as shown in FIG. 2B. This content selection process is similar to that described above; however, the content selection process combines the content provider's bid with the weighted sum probability determined by the first machine learning model, the second machine learning model, and the respective applied weights (as well as any other relevant factors) to determine a total value score. The total value score may then be used by the content selection process to determine whether to deliver the content item to the user.

As further illustrated by FIG. 2B, if the content item is selected for delivery to one or more of the corresponding users, then the multi-point optimization distribution system 202 delivers the content item to the client devices of those users (232). The multi-point optimization distribution system 202 continues to monitor the actual delivery metrics of the content item (234). If the multi-point optimization distribution system 202 determines that the actual delivery metrics continue to fail to satisfy the expected delivery metrics (236), the multi-point optimization distribution system 202 utilizes the first machine learning model and the second machine learning model and a third machine learning model to determine weighted sum probabilities that the first target event or the second target event or a third target event will result from delivery of the content item (238). Similar to the first machine learning model and the second machine learning model, the third machine learning model is trained to optimize content delivery for the third target event and is used to determine probabilities that the third target event will result from delivery of the content item to corresponding users. Additionally, in one or more embodiments, the third target event is a "lesser" event than the first target event and the second target event (though it will be recognized that the third target event could possibly be a "higher" event than the second target event). For example, if the first target event is a purchase and the second target event is an add-to-cart, the third target event may be a click.

Subsequent to receiving more content item requests (240), the multi-point optimization distribution system 202 utilizes the content selection process to determine whether to determine the deliver the content item based on the weighted sum probabilities that the first target event or the second target event or the third target event will result from delivery of the content item (242) as shown in FIG. 2C. If the content item is selected for delivery to one or more of the corresponding users, then the multi-point optimization distribution system 202 delivers the content item to the client devices of those users (244). Further, the multi-point optimization distribution system continues to monitor the actual delivery metrics of the content item (246).

As further illustrated by FIG. 2C, in one or more embodiments, the multi-point optimization distribution system 202 may determine to discontinue utilizing the content selection process to determine whether to deliver the content item based on the determined weighted sum probabilities that the first target event or the second target event or the third target event will result from delivery of the content item (248). In one or more alternative embodiments, this determination may occur earlier, such as after the content selection process determines whether to deliver the content item based on the determined weighted sum probabilities that the first target event or the second target event will result from delivery of the content item (230).

The determination to discontinue incorporating the weighted sum probabilities into the content selection process may be based on one or more of several events. For example, in one or more embodiments, the multi-point optimization distribution system 202 may make the determination after the content provider's budget for the digital content campaign has been exhausted or the content provider has otherwise ended the campaign. In one or more alternative embodiments, the multi-point optimization distribution system 202 may discontinue using the weighted sum probabilities after determining that a predetermined number of events has resulted from delivery. For example, the multi-point optimization distribution system may determine to discontinue utilizing the weighted sum probabilities after delivery has resulted in thirty first target events (e.g., purchases) or sixty second target events (e.g., add-to-carts) or ninety third target events (e.g., clicks) or any predetermined combination of events.

In one or more other embodiments, the determination to discontinue utilizing the weighted sum probabilities may also be made by determining that the actual delivery metrics have begun to satisfy or exceed the expected delivery metrics. Using the same example above, the multi-point optimization distribution system 202 may determine to utilize weighted sum probabilities after it determines that a content provider's content item has only been delivered seventy times per day over the first five days of the ten-day campaign. However, if, by the end of the eighth day, the content item has been delivered 800 times or more (i.e., the actual delivery metrics now satisfy or exceed the expected delivery metrics), the multi-point optimization distribution system 202 may choose to discontinue using the weighted sum probabilities for the last two days of the campaign.

In one or more embodiments, after the multi-point optimization distribution system 202 makes the determination to discontinue utilizing the content selection process to determine whether to deliver the content item based on the determined weighted sum probabilities that the first target event or the second target event or the third target event will result from delivery of the content item, the multi-point optimization distribution system 202 may continue to use the weighted sum probabilities that the first target event or the second target event will result from delivery of the content item. In other words, the multi-point optimization distribution system 202 may gradually decrease the number of target events for which it will optimize delivery. This may be determined by the actual delivery metrics meeting successive thresholds established relative to the expected delivery metrics. Alternatively, this may be determined after receiving predetermined numbers of events as a result of delivery. The multi-point optimization distribution system 202 may subsequently determine to discontinue utilizing the weighted sum probabilities that the first target event or the second target event will result from delivery of the content item and only continue to use the probabilities that the first target event will result.

In one or more other embodiments, after the multi-point optimization distribution system 202 makes the determination to discontinue utilizing the content selection process to determine whether to deliver the content item based on the determined weighted sum probabilities that the first target event or the second target event or the third target event will result from delivery of the content item, the multi-point optimization distribution system 202 may determine to terminate delivery of the content item altogether. This would generally be used in instances where the content provider's budget has been exhausted or the campaign has been otherwise terminated. However, it may be appreciated, that the multi-point optimization distribution system 202 may determine to terminate delivery of the content item for any number of reasons.

Figure 3:
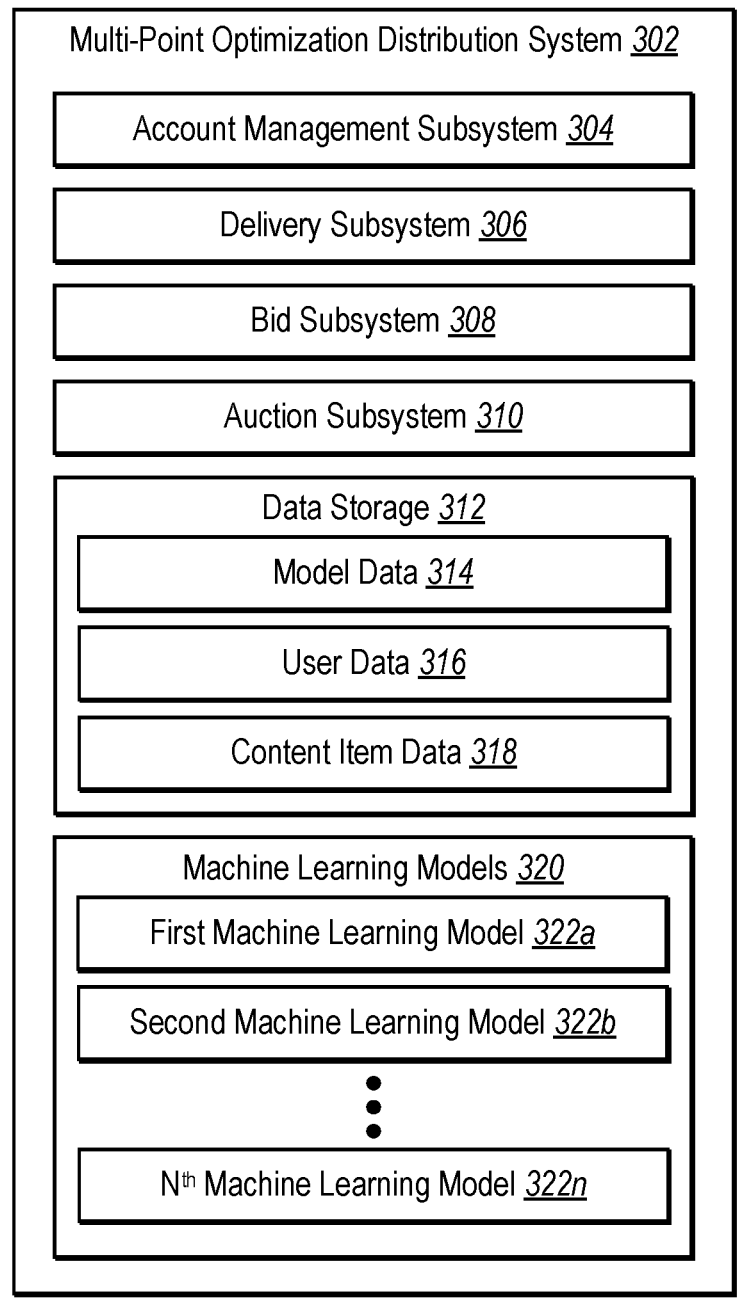
FIG. 3 illustrates an example schematic diagram of a multi-point optimization distribution system in accordance with one or more embodiments.

Turning now to FIG. 3, additional detail will be provided regarding components and capabilities of the multi-point optimization distribution system 302 (note that this is the multi-point optimization distribution system labelled 106 under FIG. 1). As shown in FIG. 3, the multi-point optimization distribution system 302 may include an account management subsystem 304, a delivery subsystem 306, a bid subsystem 308, an auction subsystem 310, data storage 312, and machine learning models 320. While FIG. 11 depicts a particular number of components, in some embodiments, the multi-point optimization distribution system 302 may include more or fewer components. In addition, the components may perform additional or alternative tasks than those described hereafter.

As mentioned, the multi-point optimization distribution system 302 includes an account management subsystem 304. In particular, the account manager subsystem 304 manages the information provided by content providers. For example, the account management subsystem 304 can receive the content item from the content provider. Additionally, the account management subsystem 304 can receive other information, such as a first target event, a second target event, the content provider's budget for the campaign and bid for each delivery, or characteristics of a target audience the content provider wants to focus on.

As also mentioned, the multi-point optimization distribution system 302 includes a delivery subsystem 306. The delivery subsystem 306 accounts for handles the metrics of delivery, as well as delivery of the content item itself. For example, upon receipt of the content item, the delivery subsystem 306 determines metrics that the content item's delivery is expected to meet. For instance, this may include determining that a content item is expected to be delivered 100 times per day throughout a ten-day campaign. The delivery subsystem 306 can also keep track of the actual delivery metrics and determine whether the actual delivery metrics fail to satisfy the expected delivery metrics. Additionally, if a content item is selected for delivery, the delivery subsystem 306 can facilitate delivery of the content item to the user through the digital content distribution platform.

Additionally, the multi-point optimization distribution system 302 includes a bid subsystem 308. In particular, the bid subsystem 308 may generate a total value to be used in the content selection process. The total value score is the combination of the content provider's bid describing how much the content provider is willing to pay per delivery, the probability (or weighted sum probability) that the first target event (or the second target event) will result from delivery of the content item, and any other relevant factors. The delivery subsystem 308 utilizes the machine learning models 320 to determine probabilities that the respective target events will result from delivery. The delivery subsystem 308 then combines these probabilities with the content provider's bid and any other relevant factors to determine a total value score.

Further, the multi-point optimization distribution system 302 includes an auction subsystem 310. The auction subsystem 310 facilitates the content selection process used to determine which content item to deliver to a user's client device in response to receiving a content item request; in other words, the content selection process determines whether to deliver a particular content provider's content item to the user. In particular, the auction subsystem receives content item requests from user client devices. Subsequently, the auction subsystem 310 receives the total value scores determined by the delivery subsystem 308 of all content items eligible to be delivered to the users. Generally, a content item is eligible for delivery if the corresponding user is within the content provider's selected target audience. If the content provider has not selected a target audience, a content item may be eligible for delivery whenever a user is able to view a content item. The auction subsystem 310 then facilitates the content selection process to determine whether or not to deliver the particular content item based on its total score value, which, in turn, is based partly on the probability that the target event(s) will result from delivery.

Additionally, the multi-point optimization distribution system 302 includes data storage 312. In particular, data storage 312 includes model data 314, user data 316, content item data 318. Model data 314 represents data used to train the machine learning models 320. It may also represent the probabilities determined by the machine learning models 320 that the respective target events will result from delivery of the content item to corresponding users. User data 316 represents data about users of the digital content distribution platform. This may include data regarding features of the user that will be used by the machine learning models 320 to determine probabilities that target events will result from delivery of a content item to the user. It may also include any other information about the user obtained by the digital content distribution platform that is relevant to the purpose of the multi-point optimization distribution system 302. Content item data 318 represents information about the content item, such any text or graphical information to be displayed to the user. Content item data 318 may also include the expected delivery metrics determined and the actual delivery metrics observed by the delivery subsystem 306.

Further, the multi-point optimization distribution system 202 includes machine learning models 320. Machine learning models 320 includes the first machine learning model 322a, the second machine learning model 322b and all other model up to the nth machine learning model 322n. All machine models are trained to optimize delivery for a particular event and may be used to determine probabilities that their respective target events will result from delivery of the content item to corresponding users.

Figure 4:
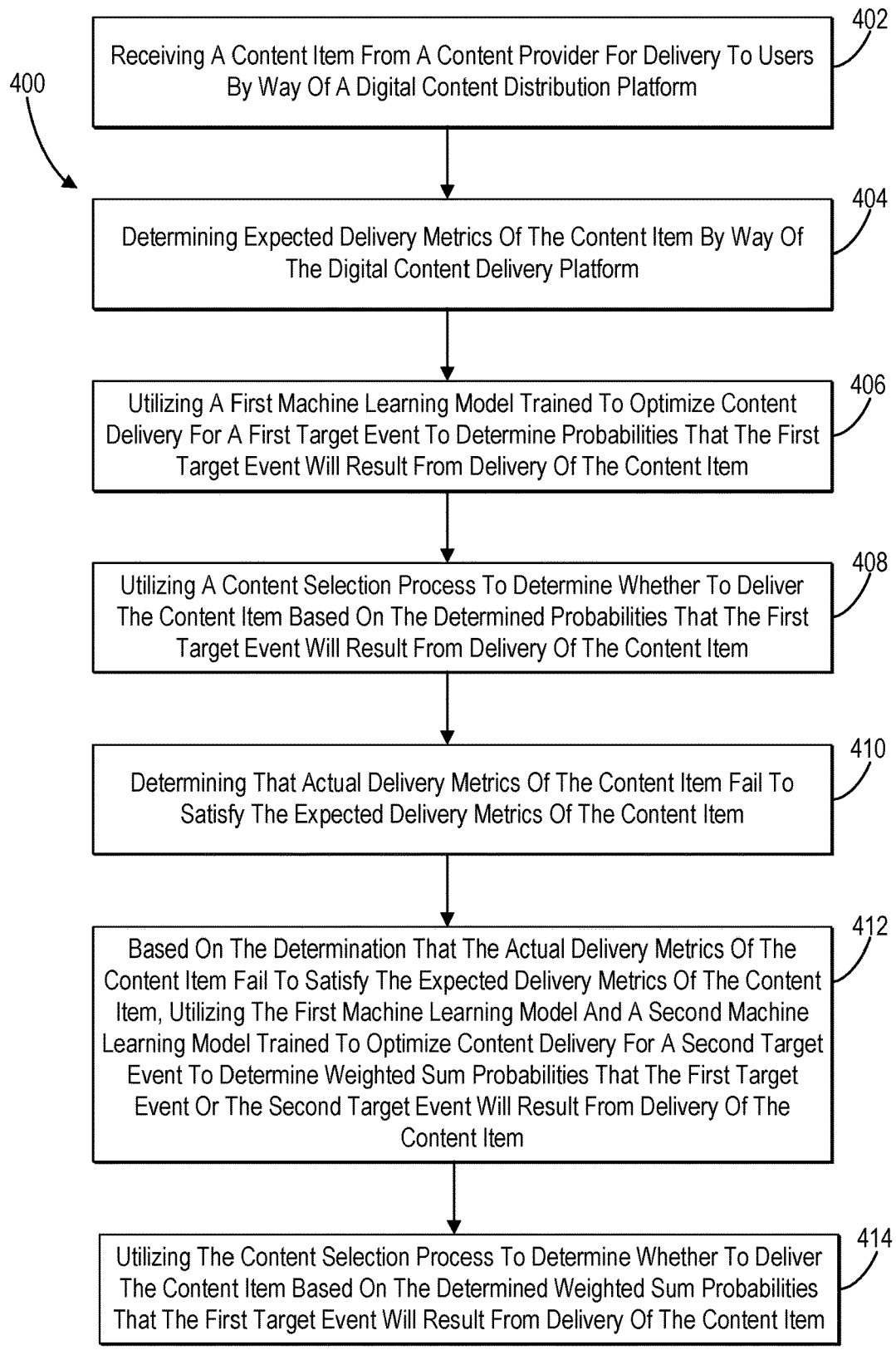
FIG. 4 illustrates a flowchart of a series of acts in a method of utilizing machine learning models to optimize distribution of digital content for multiple target events in accordance with one or more embodiments.

FIG. 4 illustrates a method 400 of a method implemented by the multi-point optimization distribution system of utilizing machine learning models to optimize distribution of digital content for multiple target events. At step 402, the multi-point optimization distribution system receives a content item from a content provider for delivery to users by way of a digital content distribution platform. As mentioned before, the multi-point optimization distribution system may receive other additional information, such as content provider bid and budget, characteristics of the target audience, first target event, second target event, and any other relevant information. At step 404, the multi-point optimization distribution system determines expected delivery metrics of the content item by way of the digital content delivery platform. Using the example discussed above, this may include taking into account the content provider's budget and bid per delivery and determining that the content item is expected to be delivered 100 times per day over the course of a ten-day campaign.

At step 406, the multi-point optimization distribution system utilizes a first machine learning model trained to optimize content delivery for a first target event to determine probabilities that the first target event will result from delivery of the content item to corresponding users. As discussed above, the first machine learning model, in particular, determines a probability that the first target event will result from delivery to an individual user. The set of probabilities contains all of the determined probabilities for the set of corresponding users. The corresponding users may be members of a target audience selected by the content provider or they may comprise any user able to view a content item.

At step 408, the multi-point optimization distribution system then utilizes a content selection process to determine whether to deliver the content item based on the determined probabilities that the first target event will result from delivery of the content item. Generally, the step takes place in response to the multi-point optimization distribution system receiving a content item request or set of content item requests. Because the user, whose client device has sent the content item request, may be a member of a target audience selected by many content providers, the multi-point optimization distribution system must determine which content item to deliver to the user's client device when a content item request is received. From the perspective of a particular content item, the multi-point optimization distribution system determines whether to deliver that content item to the user. The content selection process may use the total value score described above, which is partly dependent on the probability of the first target event resulting from delivery, in making this determination At step 410, the multi-point optimization distribution system determines that the actual delivery metrics of the content item fails to satisfy the expected delivery metrics of the content item. As discussed above, this may include determining that the actual delivery metrics fail to match the expected delivery metrics exactly. Alternatively, this may include determining that the actual delivery metrics fail to satisfy threshold metrics established relative to the expected delivery metrics.

At step 412, based on the determination that the actual delivery metrics of the content item fail to satisfy the expected delivery metrics of the content item, the multi-point optimization distribution system utilizes the first machine learning model and a second machine learning model trained to optimize content delivery for a second target event to determine weighted sum probabilities that the first target event or the second target event will result from delivery of the content item. The weighted sum probabilities are determined by applying a first weight to the probabilities determined by the first machine learning model, applying a second weight to the probabilities determined by the second machine learning model, and adding the weighted probabilities together. The applied weights may be determined by the content provider or, alternatively, by the multi-point optimization distribution system.

At step 414, the multi-point optimization distribution system utilizes the content selection process to determine whether to deliver the content item based on the determined weighted sum probabilities that the first target event or the second target event will result from delivery of the content item. The content selection process may use the total value score, using the weighted sum probabilities, to make this determination.

Figure 5:
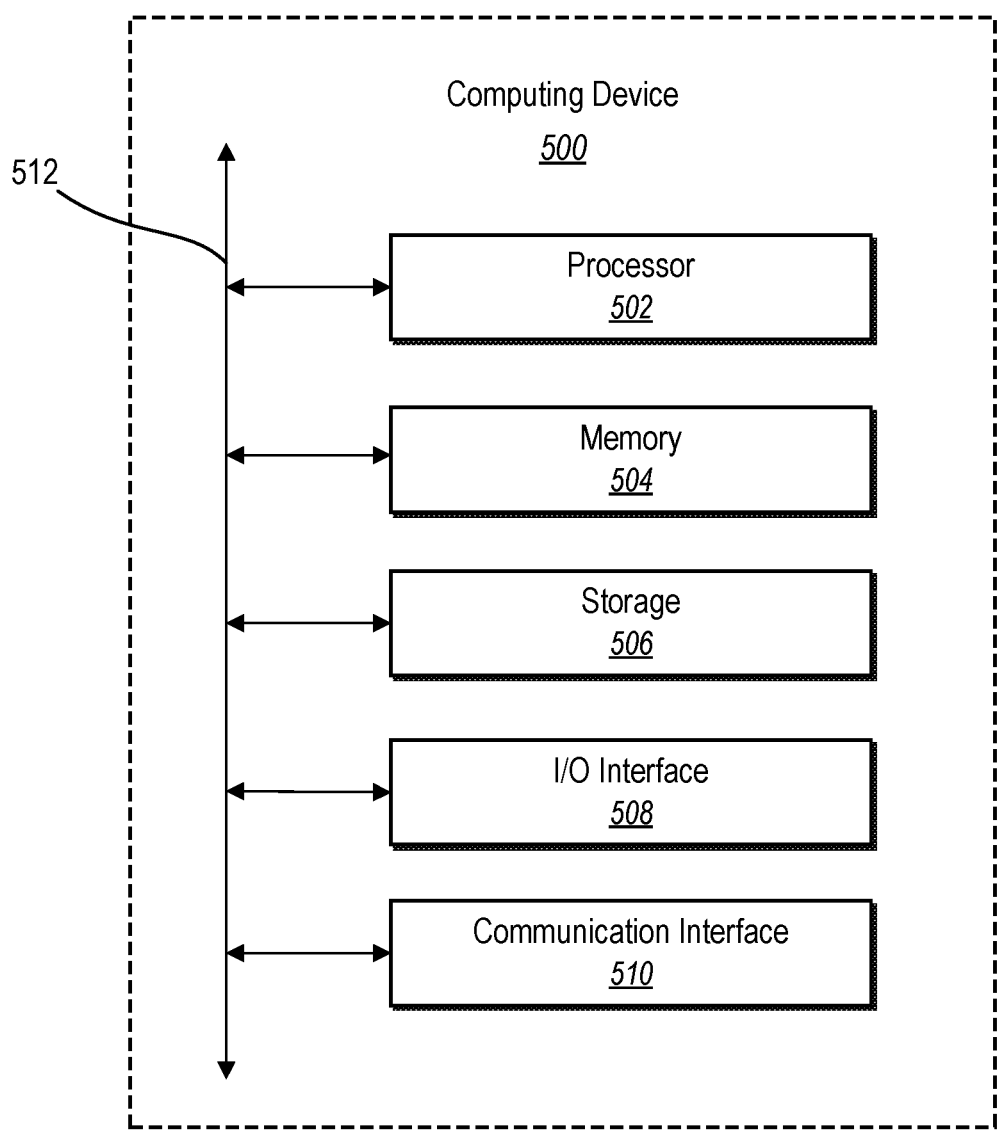
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that the computing device 500 may represent one or more client devices or server devices, such as those described previously. Further, the computing device 500 may represent various types of computing devices. For example, the computing device 500 can include: a mobile device such as a mobile telephone, a smartphone, a PDA, a tablet, a laptop; a non-mobile device such as a desktop or server; or any other type of computing device.

As shown in FIG. 5, the computing device 500 can comprise a processor 502, a memory 504, a storage device 506, an input/output ("I/O") interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5.

In one or more embodiments, the processor 502 includes hardware for executing instructions, such as those making up a computer program. The memory 504 may be used for storing data, metadata, and programs for execution by the processor(s). The storage device 506 includes storage for storing data or instructions.

The I/O interface 508 allows a user (e.g., content producer or viewer) to provide input to, receive output from, and otherwise transfer data to and receive data from computing device 500. The I/O interface 508 may include a mouse, a keypad or a keyboard, a touchscreen, a camera, an optical scanner, network interface, modem, other known I/O devices or a combination of such I/O interfaces. The I/O interface 508 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example, the communication interface 510 may include a network interface controller (NIC) or network adapter for communicating with an Ethernet or another wire-based network or a wireless NIC (WNIC) or wireless adapter for communicating with a wireless network, such as a WI-FI. The communication infrastructure 512 may include hardware, software, or both that connects components of the computing device 500 to each other. As an example, the communication infrastructure 512 may include one or more types of buses.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 6:
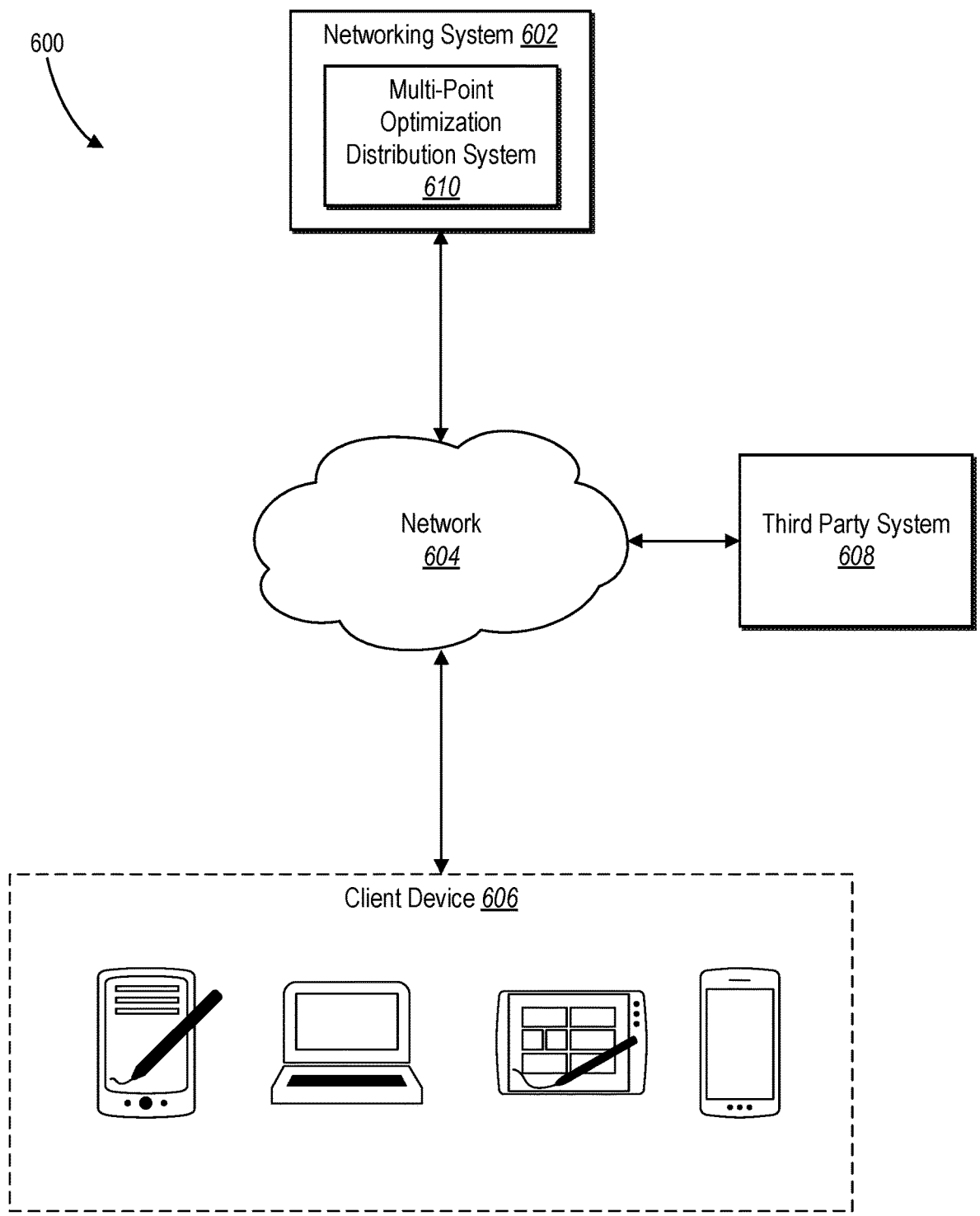
FIG. 6 illustrates an example environment of a networking system having the multi-point optimization distribution system in accordance with one or more embodiments.

FIG. 6 illustrates an example network environment 600 of a social networking system. Network environment 600 includes a client device 606, a networking system 602 (e.g., a social networking system and/or an electronic messaging system), and a third-party system 608 connected to each other by a network 604. Although FIG. 6 illustrates a particular arrangement of client device 606, networking system 602, third-party system 608, and network 604, this disclosure contemplates any suitable arrangement of client device 606, networking system 602, third-party system 608, and network 604. As an example, and not by way of limitation, two or more of client device 606, networking system 602, and third-party system 608 may be connected to each other directly, bypassing network 604. As another example, two or more of client device 606, networking system 602, and third-party system 608 may be physically or logically co-located with each other in whole or in part. Moreover, although FIG. 6 illustrates a particular number of client devices 606, networking systems 602, third-party systems 608, and networks 604, this disclosure contemplates any suitable number of client devices 606, networking systems 602, third-party systems 608, and networks 604. As an example, and not by way of limitation, network environment 600 may include multiple client device 606, networking systems 602, third-party systems 608, and networks 604.

This disclosure contemplates any suitable network 604. As an example, and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client device 606, networking system 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client device 606 may be an electronic device including hardware, software, or embedded logic components or a combination of two or more such components and capable of carrying out the appropriate functionalities implemented or supported by client device 606. As an example, and not by way of limitation, a client device 606 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 606. A client device 606 may enable a network user at client device 606 to access network 604. A client device 606 may enable its user to communicate with other users at other client devices 606.

In particular embodiments, client device 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client device 606 one or more Hyper Text Markup Language (HTML) files responsive to the HTTP request. Client device 606 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 602 may be a network-addressable computing system that can host an online social network. Networking system 602 may generate, store, receive, and send social-networking data, such as, for example, user-profile data, concept-profile data, social-graph information, or other suitable data related to the online social network. Networking system 602 may be accessed by the other components of network environment 600 either directly or via network 604. In particular embodiments, networking system 602 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 602 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 606, a networking system 602, or a third-party system 608 to manage, retrieve, modify, add, or delete, the information stored in data store.

In particular embodiments, networking system 602 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 602 may provide users of the online social network the ability to communicate and interact with other users. In particular embodiments, users may join the online social network via networking system 602 and then add connections (e.g., relationships) to a number of other users of networking system 602 that they want to be connected to. Herein, the term "friend" may refer to any other user of networking system 602 with whom a user has formed a connection, association, or relationship via networking system 602.

In particular embodiments, networking system 602 may provide users with the ability to take actions on various types of items or objects, supported by networking system 602. As an example, and not by way of limitation, the items and objects may include groups or social networks to which users of networking system 602 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 602 or by an external system of third-party system 608, which is separate from networking system 602 and coupled to networking system 602 via a network 604.

In particular embodiments, networking system 602 may be capable of linking a variety of entities. As an example, and not by way of limitation, networking system 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating networking system 602. In particular embodiments, however, networking system 602 and third-party systems 608 may operate in conjunction with each other to provide social-networking services to users of networking system 602 or third-party systems 608. In this sense, networking system 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client device 606. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 602 also includes user-generated content objects, which may enhance a user's interactions with networking system 602. User-generated content may include anything a user can add, upload, send, or "post" to networking system 602. As an example, and not by way of limitation, a user communicates posts to networking system 602 from a client device 606. Posts may include data such as status updates or other textual data, location information, photos, videos, links, music or other similar data or media. Content may also be added to networking system 602 by a third-party through a "communication channel," such as a newsfeed or stream.

In particular embodiments, networking system 602 may include a variety of servers, sub-systems, programs, modules, logs, and data stores. In particular embodiments, networking system 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 602 may also include suitable components such as network interfaces, security mechanisms, load balancers, failover servers, management-and-network-operations consoles, other suitable components, or any suitable combination thereof. In particular embodiments, networking system 602 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 602 to one or more client devices 606 or one or more third-party system 608 via network 604. The web server may include a mail server or other messaging functionality for receiving and routing messages between networking system 602 and one or more client devices 606. An API-request server may allow a third-party system 608 to access information from networking system 602 by calling one or more APIs. An action logger may be used to receive communications from a web server about a user's actions on or off networking system 602. In conjunction with the action log, a third-party-content-object log may be maintained of user exposures to third-party-content objects. A notification controller may provide information regarding content objects to a client device 606. Information may be pushed to a client device 606 as notifications, or information may be pulled from client device 606 responsive to a request received from client device 606. Authorization servers may be used to enforce one or more privacy settings of the users of networking system 602. A privacy setting of a user determines how particular information associated with a user can be shared. The authorization server may allow users to opt in to or opt out of having their actions logged by networking system 602 or shared with other systems (e.g., third-party system 608), such as, for example, by setting appropriate privacy settings. Third-party-content-object stores may be used to store content objects received from third parties, such as a third-party system 608. Location stores may be used for storing location information received from client devices 606 associated with users. Advertisement-pricing modules may combine social information, the current time, location information, or other suitable information to provide relevant advertisements, in the form of notifications, to a user.

Figure 7:
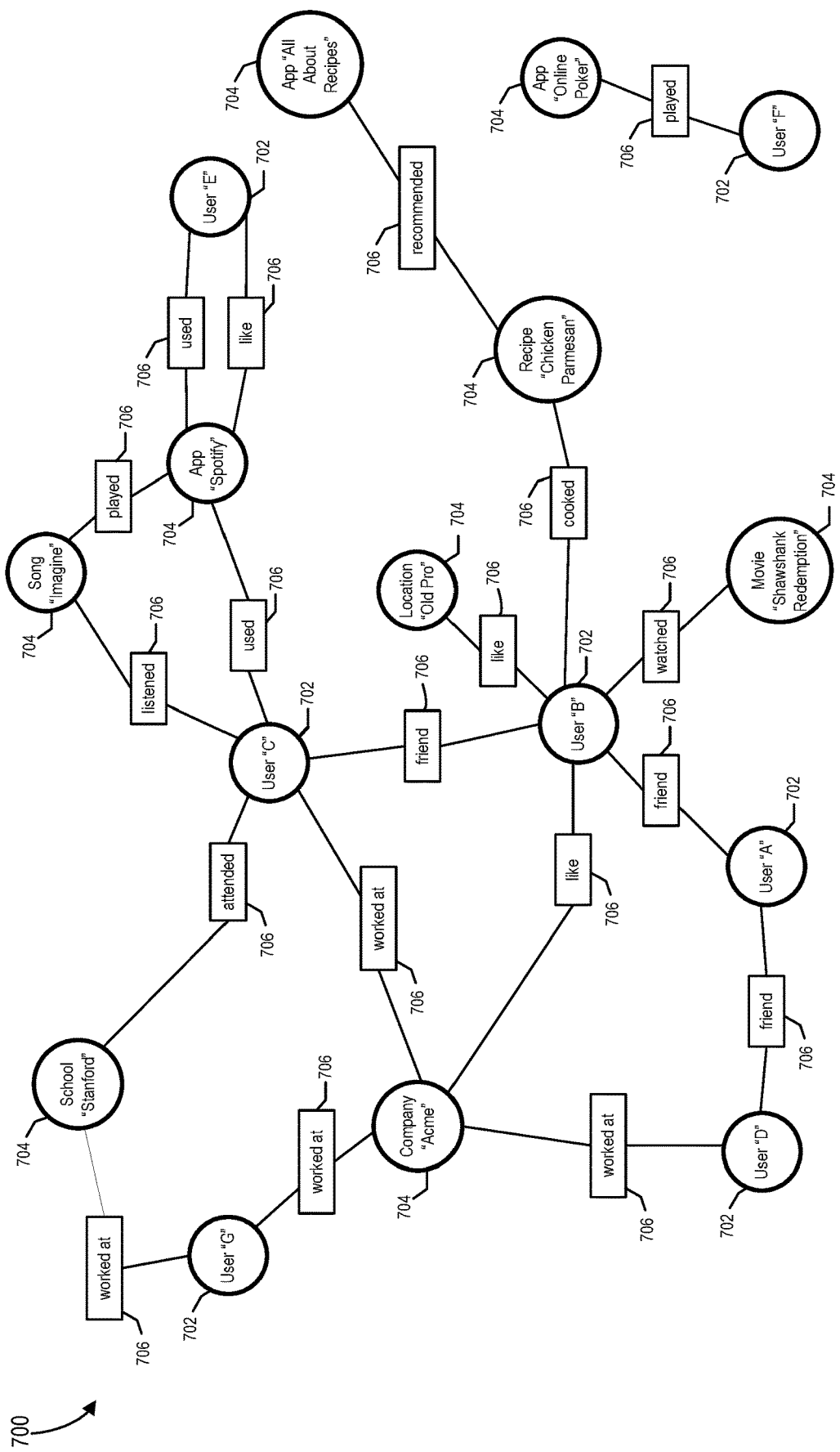
FIG. 7 illustrates an example social graph in accordance with one or more embodiments described herein.

FIG. 7 illustrates example social graph 700. In particular embodiments, networking system 602 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a networking system 602, client device 606, or third-party system 608 may access social graph 700 and related social-graph information for suitable applications. The nodes and edges of social graph 700 may be stored as data objects, for example, in a data store (such as a social-graph database). Such a data store may include one or more searchable or query able indexes of nodes or edges of social graph 700.

In particular embodiments, a user node 702 may correspond to a user of networking system 602. As an example, and not by way of limitation, a user may be an individual (human user), an entity (e.g., an enterprise, business, or third-party application), or a group (e.g., of individuals or entities) that interacts or communicates with or over networking system 602. In particular embodiments, when a user registers for an account with networking system 602, networking system 602 may create a user node 702 corresponding to the user, and store the user node 702 in one or more data stores. Users and user nodes 702 described herein may, where appropriate, refer to registered users and user nodes 702 associated with registered users. In addition, or as an alternative, users and user nodes 702 described herein may, where appropriate, refer to users that have not registered with networking system 602. In particular embodiments, a user node 702 may be associated with information provided by a user or information gathered by various systems, including networking system 602. As an example, and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with networking system 602 or a third-party website associated with a web-application server); an entity (such as, for example, a person, business, group, sports team, or celebrity); a resource (such as, for example, an audio file, video file, digital photo, text file, structured document, or application) which may be located within networking system 602 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including networking system 602. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to networking system 602. Profile pages may also be hosted on third-party websites associated with a third-party system 608. As an example, and not by way of limitation, a profile page corresponding to a particular external webpage may be the particular external webpage and the profile page may correspond to a particular concept node 704. Profile pages may be viewable by all or a selected subset of other users. As an example, and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 608. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 606 to send to networking system 602 a message indicating the user's action. In response to the message, networking system 602 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example, and not by way of limitation, a first user may indicate that a second user is a "friend" of the first user. In response to this indication, networking system 602 may send a "friend request" to the second user. If the second user confirms the "friend request," networking system 602 may create an edge 706 connecting the first user's user node 702 to the second user's user node 702 in social graph 700 and store edge 706 as social-graph information in one or more of data stores. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example, and not by way of limitation, an edge 706 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example, and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, networking system 602 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 602 may create a "listened" edge 706 and a "used" edge (as illustrated in FIG. 7) between user nodes 702 corresponding to the user and concept nodes 704 corresponding to the song and application to indicate that the user listened to the song and used the application. Moreover, networking system 602 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example, and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, networking system 602 may create an edge 706 between a user node 702 and a concept node 704 in social graph 700. As an example and not by way of limitation, a user viewing a concept-profile page (such as, for example, by using a web browser or a special-purpose application hosted by the user's client device 606) may indicate that he or she likes the concept represented by the concept node 704 by clicking or selecting a "Like" icon, which may cause the user's client device 606 to send to networking system 602 a message indicating the user's liking of the concept associated with the concept-profile page. In response to the message, networking system 602 may create an edge 706 between user node 702 associated with the user and concept node 704, as illustrated by "like" edge 706 between the user and concept node 704. In particular embodiments, networking system 602 may store an edge 706 in one or more data stores. In particular embodiments, an edge 706 may be automatically formed by networking system 602 in response to a particular user action. As an example, and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, a content item may be text (which may be HTML-linked), one or more images (which may be HTML-linked), one or more videos, audio, one or more ADOBE FLASH files, a suitable combination of these, or any other suitable content in any suitable digital format presented on one or more webpages, in one or more e-mails, or in connection with search results requested by a user. In addition, or as an alternative, a content item may be one or more sponsored stories (e.g., a news-feed or ticker item on networking system 602). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that a content provider promotes, for example, by having the social action presented within a predetermined area of a profile page of a user or other page, presented with additional information associated with the content provider, bumped up or otherwise highlighted within news feeds or tickers of other users, or otherwise promoted. The content provider may pay to have the social action promoted. As an example, and not by way of limitation, content items may be included among the search results of a search-results page, where sponsored content is promoted over non-sponsored content.

In particular embodiments, a content item may be requested for display within social-networking-system webpages, third-party webpages, or other pages. A content item may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, a content item may be displayed within an application. A content item may be displayed within dedicated pages, requiring the user to interact with or watch the content before the user may access a page or utilize an application. The user may, for example view the content item through a web browser.

A user may interact with a content item in any suitable manner. The user may click or otherwise select the content item. By selecting the content item, the user may be directed to (or a browser or other application being used by the user) a page associated with the content item. At the page associated with the content item, the user may take additional actions, such as purchasing a product or service associated with the content item, receiving information associated with the content item, or subscribing to a newsletter associated with the content item. A content item with audio or video may be played by selecting a component of the content item (like a "play button"). Alternatively, by selecting the content item, networking system 602 may execute or modify a particular action of the user.

A content item may also include social-networking-system functionality that a user may interact with. As an example, and not by way of limitation, a content item may enable a user to "like" or otherwise endorse the content item by selecting an icon or link associated with endorsement. As another example and not by way of limitation, a content item may enable a user to search (e.g., by executing a query) for content related to the content provider. Similarly, a user may share the content item with another user (e.g., through networking system 602) or RSVP (e.g., through networking system 602) to an event associated with the content item. In addition, or as an alternative, a content item may include social-networking-system context directed to the user. As an example, and not by way of limitation, a content item may display information about a friend of the user within networking system 602 who has taken an action associated with the subject matter of the advertisement.

In particular embodiments, networking system 602 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof.

Affinity may also be determined with respect to objects associated with third-party systems 608 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 602 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 602 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 602 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 602 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 602 may calculate a coefficient based on a user's actions. Networking system 602 may monitor such actions on the online social network, on a third-party system 608, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 602 may calculate a coefficient based on the user's actions with particular types of content. The content may be associated with the online social network, a third-party system 608, or another suitable system. The content may include users, profile pages, posts, news stories, headlines, instant messages, chat room conversations, emails, advertisements, pictures, video, music, other suitable objects, or any combination thereof. Networking system 602 may analyze a user's actions to determine whether one or more of the actions indicate an affinity for subject matter, content, other users, and so forth. As an example, and not by way of limitation, if a user may make frequently posts content related to "coffee" or variants thereof, networking system 602 may determine the user has a high coefficient with respect to the concept "coffee." Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, networking system 602 may calculate a coefficient based on the type of relationship between particular objects. Referencing the social graph 700, networking system 602 may analyze the number and/or type of edges 706 connecting particular user nodes 702 and concept nodes 704 when calculating a coefficient. As an example, and not by way of limitation, user nodes 702 that are connected by a spouse-type edge (representing that the two users are married) may be assigned a higher coefficient than a user node 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, networking system 602 may determine that the user has a higher coefficient with respect to the first photo than the second photo because having a tagged-in-type relationship with content may be assigned a higher weight and/or rating than having a like-type relationship with content. In particular embodiments, networking system 602 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, networking system 602 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example, and not by way of limitation, social-graph entities that are closer in the social graph 700 (i.e., fewer degrees of separation) may have a higher coefficient than entities that are further apart in the social graph 700.

In particular embodiments, networking system 602 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 606 of the user). A first user may be more interested in other users or concepts that are closer to the first user. As an example and not by way of limitation, if a user is one mile from an airport and two miles from a gas station, networking system 602 may determine that the user has a higher coefficient for the airport than the gas station based on the proximity of the airport to the user.

In particular embodiments, networking system 602 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 602 may provide information that is relevant to user's interests and current circumstances, increasing the likelihood that they will find such information of interest. In particular embodiments, networking system 602 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 602 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, networking system 602 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 608 (e.g., via an API or other communication channel), or from another suitable system. In response to the request, networking system 602 may calculate the coefficient (or access the coefficient information if it has previously been calculated and stored). In particular embodiments, networking system 602 may measure an affinity with respect to a particular process. Different processes (both internal and external to the online social network) may request a coefficient for a particular object or set of objects. Networking system 602 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,4027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by networking system 602 or shared with other systems (e.g., third-party system 608). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 608, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 602 may send a request to the data store for the object. The request may identify the user associated with the request and may only be sent to the user (or a client device 606 of the user) if the authorization server determines that the user is authorized to access the object based on the privacy settings associated with the object. If the requesting user is not authorized to access the object, the authorization server may prevent the requested object from being retrieved from the data store, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving a content item from a content provider for delivery to users by way of a digital content distribution platform;
   determining expected delivery metrics of the content item by way of the digital content distribution platform;
   utilizing a first machine learning model trained to optimize content delivery for a first target event to determine probabilities that the first target event will result from delivery of the content item to corresponding users;
   utilizing a content selection process to determine whether to deliver the content item based on the determined probabilities that the first target event will result from delivery of the content item;
   determining that actual delivery metrics of the content item fail to satisfy the expected delivery metrics of the content item;
   based on the determination that the actual delivery metrics of the content item fail to satisfy the expected delivery metrics of the content item, utilizing the first machine learning model and a second machine learning model trained to optimize content delivery for a second target event to determine weighted sum probabilities that the first target event or the second target event will result from delivery of the content item; and
   utilizing the content selection process to determine whether to deliver the content item based on the determined weighted sum probabilities that the first target event or the second target event will result from delivery of the content item.

2. The method of claim 1, wherein the expected delivery metrics are established by the content provider.

3. The method of claim 1, wherein the expected delivery metrics comprise a delivery pace that changes with time.

4. The method of claim 1, wherein the first machine learning model determines probabilities that the first target event will result from delivery of the content item to corresponding users based on histories of the corresponding users of engaging in the first target event.

5. The method of claim 1, wherein the corresponding users are members of a target audience selected by the content provider.

6. The method of claim 1, wherein utilizing the content selection process is in response to receiving a content item request.

7. The method of claim 1, wherein determining that the actual delivery metrics of the content item fail to satisfy the expected delivery metrics of the content item comprises determining that the actual delivery metrics of the content item fail to exactly match the expected delivery metrics of the content item.

8. The method of claim 1, wherein determining that the actual delivery metrics of the content item fail to satisfy the expected delivery metrics of the content item comprises determining that the actual delivery metrics of the content item fail to meet a threshold of delivery metrics established relative to the expected delivery metrics of the content item.

9. The method of claim 1, wherein the second machine learning model trained to optimize content delivery for the second target event determines probabilities that the second target event will result from delivery of the content item to corresponding users.

10. The method of claim 9, wherein utilizing the first machine learning model and the second machine learning model to determine weighted sum probabilities that the first target event or the second target event will result from delivery of the content item comprises:
applying a first weight to the determined probabilities that the first target event will result from delivery of the content item to corresponding users;
applying a second weight to the determined probabilities that the second target event will result from delivery of the content item to corresponding users; and
adding the first weighted probabilities and the second weighted probabilities.

11. The method of claim 10, wherein the first weight and the second weight are determined by the content provider.

12. The method of claim 1, further comprising, subsequent to utilizing the content selection process to determine whether to deliver the content item based on the determined weighted sum probabilities that the first target event or the second target event will result from delivery of the content item, determining that the actual delivery metrics of the content item continue to fail to satisfy the expected delivery metrics of the content item.

13. The method of claim 12, based on determining that the actual delivery metrics of the content item continue to fail to satisfy the expected delivery metrics of the content item, further comprising:
utilizing a third machine learning model trained to optimize content delivery for a third target event to determine probabilities that the third target event will result from delivery of the content item to corresponding users;
utilizing the first machine learning model, the second machine learning model, and the third machine learning model to determine weighted sum probabilities that the first target event or the second target event or the third target event will result from delivery of the content item; and
utilizing the content selection process to determine whether to deliver the content item based on the determined weighted sum probabilities that the first target event or the second target event or the third target event will result from delivery of the content item.

14. The method of claim 1, further comprising, subsequent to utilizing the content selection process to determine whether to deliver the content item based on the determined weighted sum probabilities that the first target event or the second target event will result from delivery of the content item, determining to discontinue utilizing the content selection process to determine whether to deliver the content item based on the determined weighted sum probabilities that the first target event or the second target event will result from delivery of the content item.

15. The method of claim 14, wherein determining to discontinue utilizing the content selection process to determine whether to deliver the content item based on the determined weighted sum probabilities that the first target event or the second target event will result from delivery of the content item comprises determining that a predetermined number of events has resulted from delivery of the content item.

16. The method of claim 15, wherein determining that the predetermined number of events has resulted from delivery of the content item comprises determining that a predetermined number of first target events has resulted from delivery of the content item.

17. The method of claim 15, wherein determining that the predetermined number of events has resulted from delivery of the content item comprises determining that a predetermined number of second target events has resulted from delivery of the content item.

18. A system comprising:
at least one processor; and
a non-transitory computer readable storage medium comprising instructions that, when executed by the at least one processor, causes the system to:
receive a content item from a content provider for delivery to users by way of a digital content distribution platform;
determine expected delivery metrics of the content item by way of the digital content distribution platform;
utilize a first machine learning model trained to optimize content delivery for a first target event to determine probabilities that the first target event will result from delivery of the content item to corresponding users;
utilize a content selection process to determine whether to deliver the content item based on the determined probabilities that the first target event will result from delivery of the content item;
determine that actual delivery metrics of the content item fail to satisfy the expected delivery metrics of the content item;
based on the determination that the actual delivery metrics of the content item fail to satisfy the expected delivery metrics of the content item, utilize the first machine learning model and a second machine learning model trained to optimize content delivery for a second target event to determine weighted sum probabilities that the first target event or the second target event will result from delivery of the content item; and
utilize the content selection process to determine whether to deliver the content item based on the determined weighted sum probabilities that the first target event or the second target event will result from delivery of the content item.

19. The system of claim 18, wherein determining that the actual delivery metrics of the content item fail to satisfy the expected delivery metrics of the content item comprises determining that the actual delivery metrics of the content item fail to meet a threshold of delivery metrics established relative to the expected delivery metrics of the content item.

20. A non-transitory computer readable storage medium comprising instructions that, when executed by at least one processor, cause a computer device to:
receive a content item from a content provider for delivery to users by way of a digital content distribution platform;
determine expected delivery metrics of the content item by way of the digital content distribution platform;
utilize a first machine learning model trained to optimize content delivery for a first target event to determine probabilities that the first target event will result from delivery of the content item to corresponding users;
utilize a content selection process to determine whether to deliver the content item based on the determined probabilities that the first target event will result from delivery of the content item;
determine that actual delivery metrics of the content item fail to satisfy the expected delivery metrics of the content item;

based on the determination that the actual delivery metrics of the content item fail to satisfy the expected delivery metrics of the content item, utilize the first machine learning model and a second machine learning model trained to optimize content delivery for a second target event to determine weighted sum probabilities that the first target event or the second target event will result from delivery of the content item; and utilize the content selection process to determine whether to deliver the content item based on the determined weighted sum probabilities that the first target event or the second target event will result from delivery of the content item.

* * * * *